(12) United States Patent  
Zhang

(10) Patent No.: US 9,003,673 B2  
(45) Date of Patent: Apr. 14, 2015

(54) DEPTH TESTING DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 13/851,284

(22) Filed: Mar. 27, 2013

(65) Prior Publication Data

US 2013/0298414 A1 Nov. 14, 2013

(30) Foreign Application Priority Data

May 10, 2012 (CN) .......................... 2012 1 0143430

(51) Int. Cl.
*G01B 3/28* (2006.01)
*G01B 5/18* (2006.01)

(52) U.S. Cl.
CPC ... *G01B 5/18* (2013.01); *G01B 3/28* (2013.01)

(58) Field of Classification Search
CPC .............. G01B 3/22; G01B 3/28; G01B 5/18; G01B 7/26

USPC ............................ 33/791, 792, 832, 833, 836
See application file for complete search history.

(56) References Cited

U.S. PATENT DOCUMENTS

| | | | | |
|---|---|---|---|---|
| 3,983,633 | A * | 10/1976 | Kaifesh ........................ | 33/199 R |
| 4,875,294 | A * | 10/1989 | Jefferson ........................ | 33/539 |
| 6,044,573 | A * | 4/2000 | Cockrill ........................ | 33/836 |
| 6,121,890 | A * | 9/2000 | Tetreault ........................ | 33/558 |
| 7,716,845 | B1* | 5/2010 | Willis ........................ | 33/506 |
| 2006/0207118 | A1* | 9/2006 | Kim ........................ | 33/512 |
| 2009/0313842 | A1* | 12/2009 | Wu et al. ........................ | 33/556 |
| 2010/0154238 | A1* | 6/2010 | Harshbarger et al. ........... | 33/836 |
| 2011/0000344 | A1* | 1/2011 | Summers ........................ | 33/567.1 |
| 2011/0166824 | A1* | 7/2011 | Haisty et al. ........................ | 29/700 |

* cited by examiner

*Primary Examiner* — Brad Bennett
(74) *Attorney, Agent, or Firm* — Novak Druce Connolly Bove + Quigg LLP

(57) ABSTRACT

A depth testing device for testing depth of a screw drive includes a supporting assembly which is for supporting the screw, a calibrating assembly, and a testing assembly. The calibrating assembly includes a calibrating element which presses on the top end of the screw. The testing assembly includes a testing device and a testing probe, the testing device includes a testing member and a testing pole stretching relative to the testing member. One end of the testing probe is received in the testing pole. The reading of the testing member is reset to zero first, then the other end of the testing probe is moved and is inserted into the drive of the screw, recording the reading of the testing member. The depth of the drive of the screw is calculated by the test reading subtracted by the thickness of the calibrating element.

14 Claims, 5 Drawing Sheets

DEPTH TESTING DEVICE

BACKGROUND

1. Technical Field

The present disclosure generally relates to a depth testing device, especially to a depth testing device for testing depths of screw drives.

2. Description of Related Art

Slotted screws are widely used to connect different elements. The drive formed in the screw should have a certain depth to assure the fastening strength of the elements.

The known method to test the depth of the drive usually uses calipers (when the volume of the screw is large). However, testing using calipers may not produce precise results. When the volume of the screw is small, a cutting-projecting method may be used to test the depth of the drive. However, since the screw is small, it is difficult to assure the cutting precision of the screw, thereby the test results are not precise either. Furthermore, cutting the screw is tedious work.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
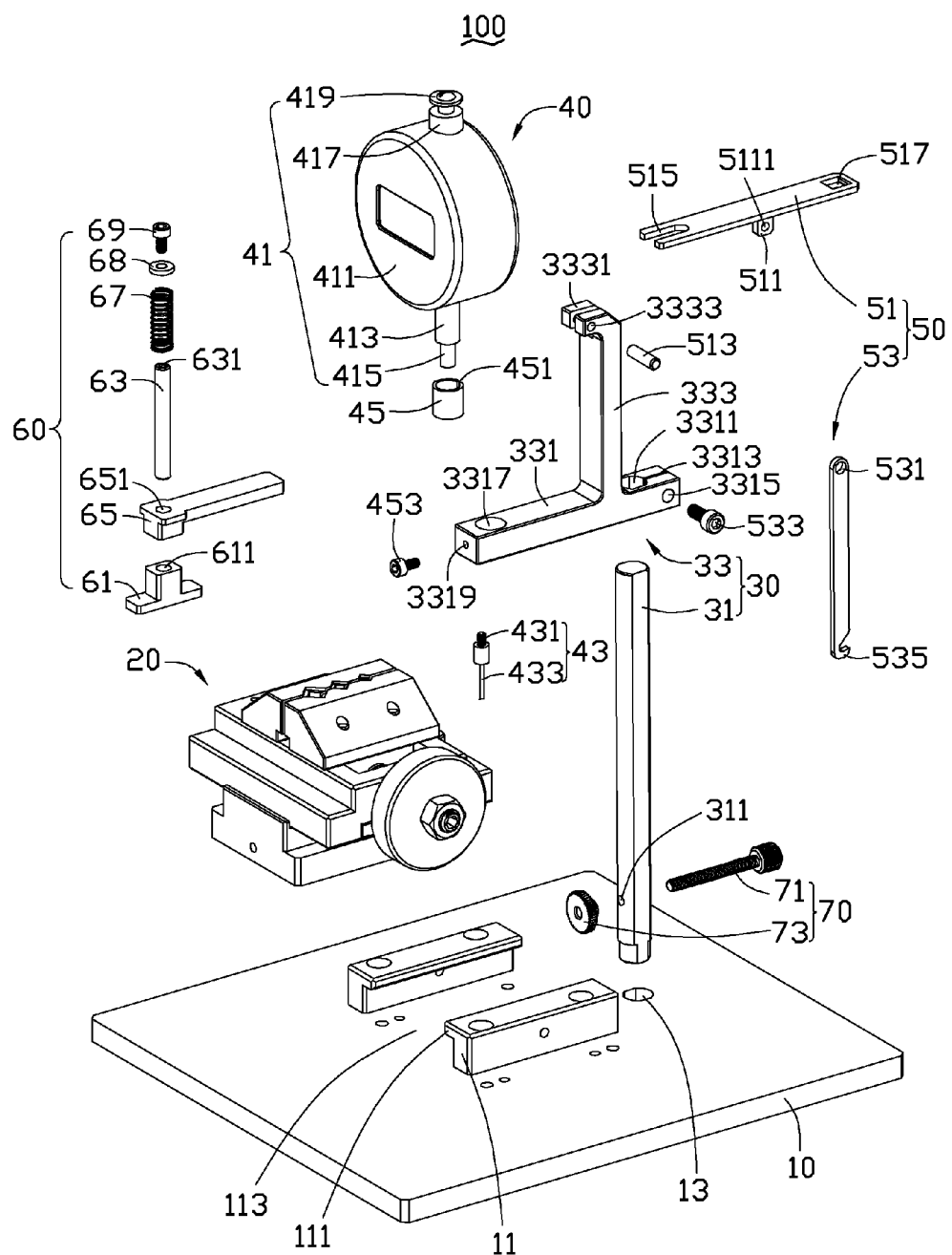
FIG. 1 is an exploded view of a depth testing device for testing the depth of screw drives in accordance with an exemplary embodiment; the depth testing device includes a supporting assembly, a testing assembly, and a calibrating assembly having a calibrating element.

FIG. 1 shows a depth testing device 100 for testing depths of screw drives. The depth testing device 100 includes a base 10, a supporting assembly 20, a holding assembly 30, a testing assembly 40, a catching assembly 50, and a calibrating assembly 60.

The base 10 includes two guiding blocks 11 which face and are in parallel to each other. The end of each guiding block 11 far from the base 10 protrudes to define a resisting block 111 towards the other guiding block 11. The guiding blocks 11, the resisting blocks 111, and the base 10 cooperate to form a guiding drive 113. The base 10 further defines a guiding through hole 13.

Figure 2:
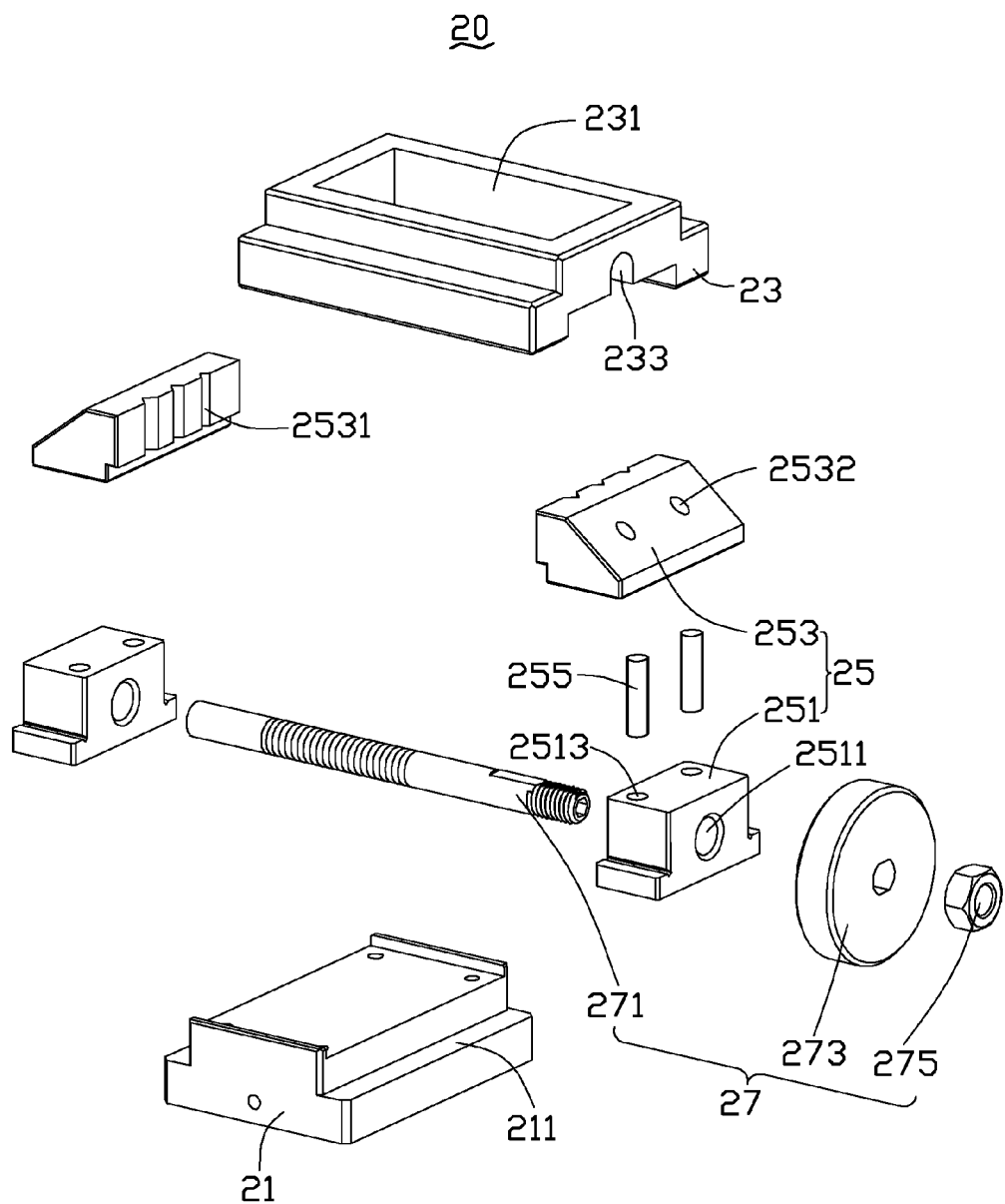
FIG. 2 is an exploded view of the supporting assembly of the depth testing device shown in FIG. 1.
Figure 4:
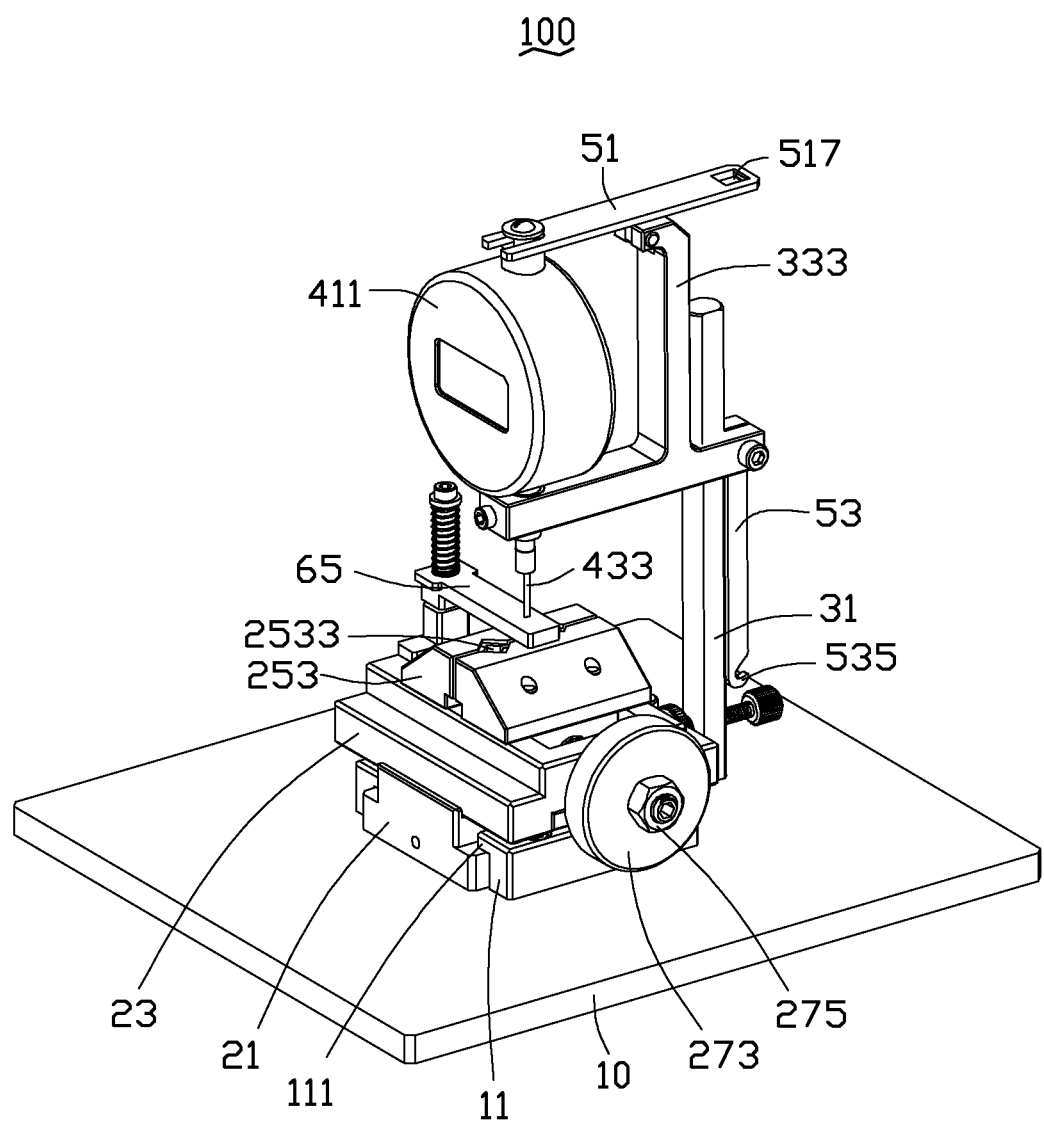
FIG. 4 is a schematic view of the depth testing device of FIG. 3 with the testing assembly pressing on the calibrating element.
Figure 5:
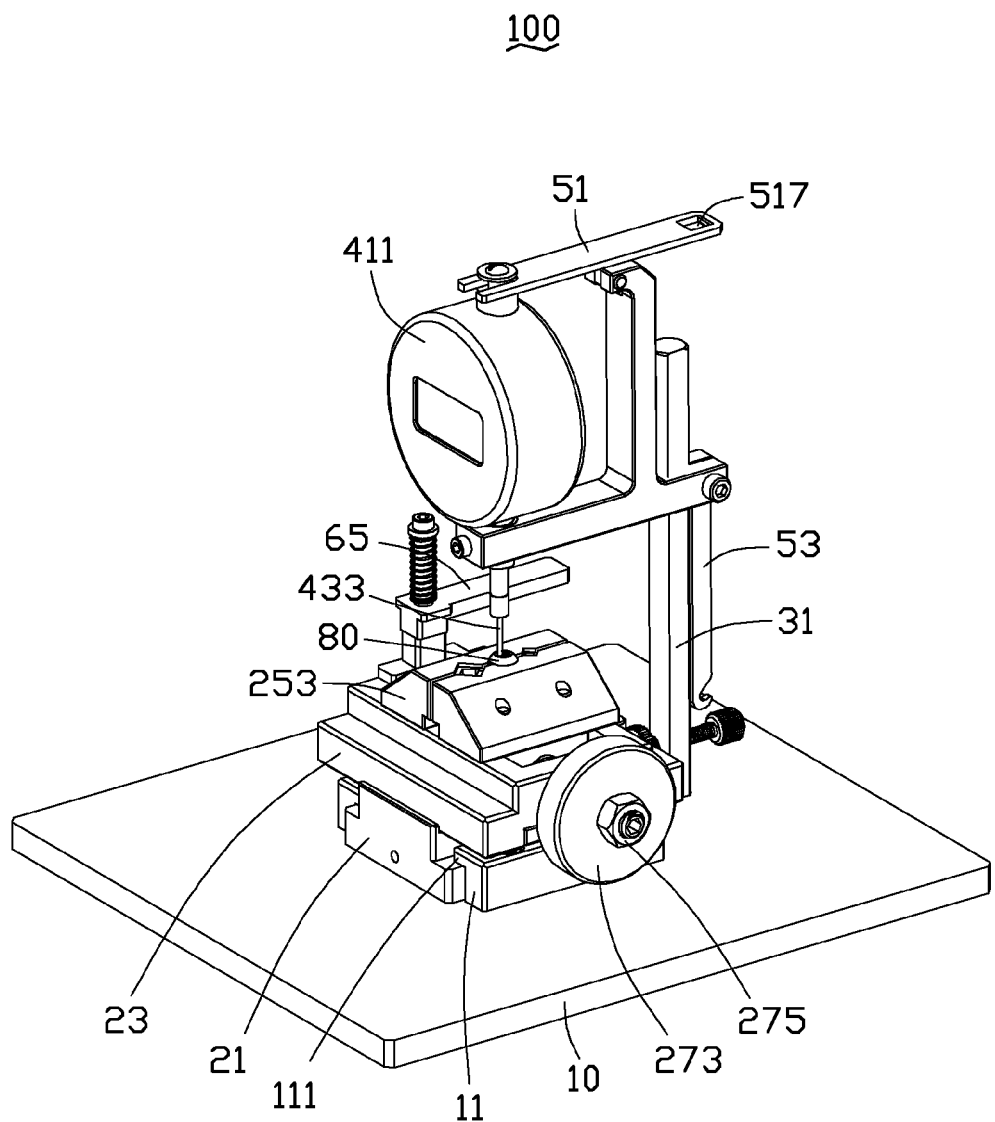
FIG. 5 is a schematic view of the depth testing device of FIG. 3 with the testing assembly pressing on a workpiece for testing.

The supporting assembly 20 is slidably mounted in the guiding drive 113 (see FIGS. 4 and 5). Also referring to FIG. 2, the supporting assembly 20 includes a sliding element 21, a mounting element 23, two supporting elements 25, and an adjusting module 27.

The sliding element 21 defines two steps 211 opposite to each other on two sides of the sliding element 21. The sliding element 21 can slide in or out of the guiding drive 113, during which the two resisting blocks 111 of the guiding blocks 11 resist and mate with the two steps 211 of the sliding element 21, which smoothes the sliding process. The mounting element 23 is assembled on the sliding element 21. The mounting element 23 defines a first mounting space 231 in the top of the mounting element 23, and a second mounting space 233 in the bottom of the mounting element 23. The first mounting space 231 communicates with the second mounting space 233.

Each supporting element 25 includes a main body 251 and a supporting block 253 fastened on the main body 251. Each main body 251 defines a mounting hole 2511 radially corresponding to the second mounting space 233, and two first assembling holes 2513 axially. The main bodies 251 are received in the first mounting space 231. Each supporting block 253 defines a plurality of recesses 2531 in the side towards the other supporting block 253, and two second assembling holes 2532 corresponding to the first assembling holes 2513. Each supporting block 253 is fastened to a main body 251 by two connecting members 255 respectively passing through each of the first assembling holes 2513 and a corresponding second assembling hole 2532. The supporting blocks 253 are positioned on the mounting element 23. The recesses 2531 of the two supporting blocks 253 cooperate to form a supporting drive 2533 (see FIG. 3) for catching and fastening a workpiece for testing.

The adjusting module 27 includes an adjusting rod 271, a hand shank 273, and a locking member 275. The adjusting rod 271 defines screw threads. The locking member 275 can be a screw head. The adjusting rod 271 is received in the second mounting space 233, and then the two main bodies 251 are mounted to the two ends of the adjusting rod 271 by the mounting holes 2511, thereby mounting the two supporting elements 25 to the mounting element 23. Following, the hand shank 273 is mounted to one of the free end of the adjusting rod 271 and is fastened to the adjusting rod 271 by the locking member 275. The hand shank 273 is used to adjust the width of the supporting drive 2533 for fastening different size workpieces. That is, when the hand shank 273 is rotated, the two supporting elements 25 move towards each other or away from each other, thereby the width of the supporting drive 2533 is changed.

The holding assembly 30 includes a holding column 31 and a holding bracket 33. The holding column 31 is interference fit in the guiding hole 13 of the base 10, thereby fixing the holding column 31 to the base 10. The holding bracket 33 includes a first holding portion 331 and a perpendicular second holding portion 333. The first holding portion 331 defines a first holding hole 3311, a holding groove 3313, and a first locking hole 3315 in one end of the first holding portion 331, and defines a second holding hole 3317 and a second locking hole 3319 in the other end of the first holding portion 331.

The holding column 31 is interference fit in the first holding hole 3311, thereby fixing the holding bracket 33 to the holding column 31. The holding groove 3313 communicates the first holding hole 3311 and the end wall of the first holding portion 331. The first locking hole 3315 is defined in the side wall of the first holding portion 331 communicating with the holding groove 3313. The second locking hole 3319 is defined in the other end wall of the first holding portion 331 communicating with the second holding hole 3317. The second holding portion 333 defines two catching arms 3331 protruding from a free end of the second holding portion 333. The two catching arms 3331 face each other, and define a catching hole 3333 therein.

The testing assembly 40 includes a testing device 41, a testing probe 43, and a protecting ring 45. The testing device 41 includes a testing member 411, a first fastening ring 413 connected to the bottom end of the testing member 411, a testing pole 415 extended out of the testing member 411 and the fastening ring 413, a second fastening ring 417 positioned on the top end of the testing member 411, and a stretching pole 419 removably received in the second fastening ring 417. The first fastening ring 413 is located around the testing pole 415. The stretching pole 419 can be partially stretch in or out of the second fastening ring 417. The testing member 411 connects the testing pole 415 to the stretching pole 419, thereby the testing pole 415 can also be received in or out of the first fastening ring 413. The testing probe 43 includes a top portion 431 and a bottom end portion 433. The top portion 431 defines screw threads to be threaded to the testing pole 415. The bottom end portion 433 is shaped like a triangular prism. The protecting ring 45 defines a catching groove 451 in the peripheral wall of the protecting ring 45 axially. The first fastening ring 413 of the testing device 41 is received in the protecting ring 45, the protecting ring 45 is received in the second holding hole 3317, a first locking element 453 is provided to pass through the second locking hole 3319 and be caught in the catching groove 451, thereby fastening the testing device 41 to the holding assembly 30.

The catching assembly 50 includes a pressing plate 51 and a hook 53. A mounting hole 5111 is defined in a mounting portion 511 on the bottom surface of the pressing plate 51. The mounting portion 511 is located between the catching arms 3331, allowing the mounting hole 5111 to align with the catching holes 3333, and a mounting post 513 is provided to pass through the catching holes 3333 and the mounting hole 5111, thereby fastening the pressing plate 51 to the holding assembly 30.

The pressing plate 51 defines a holding notch 515 at one end of the pressing plate 51, a clasping hole 517 is defined at the other end of the pressing plate 51. The holding notch 515 catches the peripheral wall of the stretching pole 419 allowing the testing device 41 to be caught by the pressing plate 51. One end of the hook 53 defines a hook portion 535, a matching hole 531 is defined in the other end and is mounted in the holding groove 3313, allowing the matching hole 531 to align with the first locking hole 3315. A second locking element 533 is provided to pass through the locking hole 3315 and the matching hole 531, thereby fastening the hook 53 to the holding bracket 33. The second locking element 533 can be a screw. The hook portion 535 can be rotated to clasp the clasping hole 517, thereby fastening the pressing plate 51.

The calibrating assembly 60 includes a fastening element 61, a pulling rod 63, a calibrating element 65, a spring 67, a blade 68 defining a central hole, and a third locking element 69. The fastening element 61 defines a first fixing hole 611, and is mounted on the supporting assembly 20. The pulling rod 63 defines a blind hole 631 in the end away from the calibrating element 65. A second fixing hole 651 is defined in one side of the calibrating element 65 which allows the pulling rod 63 to pass through and then match in the first fixing hole 611, then the calibrating element 65 can rotate around the pulling rod 63. The other side of the calibrating element 65 has a thickness recorded as H2. The spring 67 is located around the pulling rod 63, the blade 68 contacts the spring 67, and then the third locking element 69 passes through the central hole of the blade 68 to match in the blind hole 631. As such an elastic force is produced to drive the rotation of the calibrating element 65 around the pulling rod 63.

The depth testing device 100 can further include a limiting assembly 70. The limiting assembly 70 includes a limiting screw 71 and a nut 73. A limiting hole 311 is defined in the holding column 31 allowing the limiting screw 71 to pass through, and the nut 73 that is positioned around the free end of the limiting screw 71 fastens the limiting screw 71 to the holding column 31. At this time, the free end of the limiting screw 71 resists the supporting assembly 20, thereby limiting the position of the supporting assembly 20 in the guiding drive 113.

Figure 3:
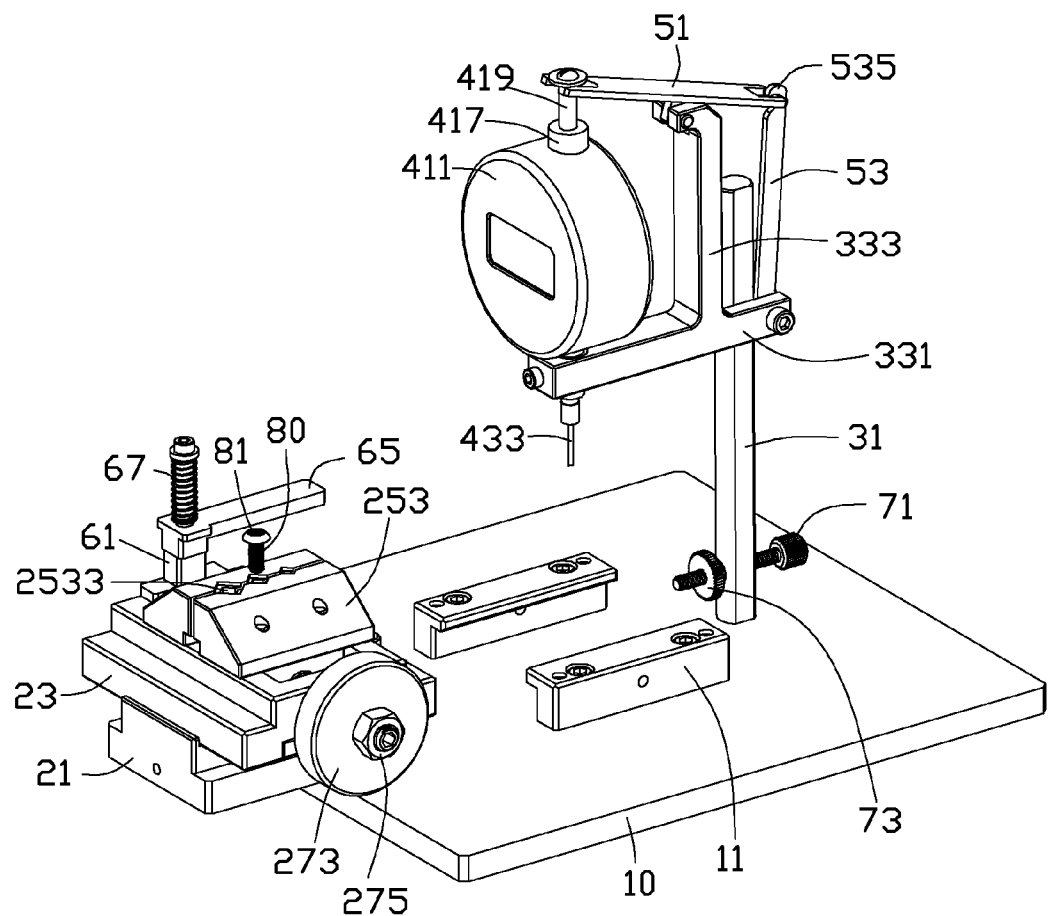
FIG. 3 is a partial assembly view of the depth testing device of FIG. 1.

FIG. 3 also shows that when using the depth testing device 100, the pressing plate 51 is first pressed to allow the stretching pole 419 to be caught by the holding notch 515 and lifts up the testing device 40. Then the hook 53 is rotated to clasp the clasping hole 517, thereby setting the position of the testing device 40. A workpiece 80 is provided and positioned in the supporting drive 2533 to be tested, the workpiece 80 is a slotted screw and defines a screw drive 81 in the top of the workpiece 80. The hand shank 273 is rotated to make the supporting elements 25 move towards each other to catch the workpiece 80. The supporting assembly 20 slides into the guiding drive 113 until abutting the limiting assembly 70 (see FIG. 4). The calibrating element 65 is rotated around the pulling rod 63 to make the calibrating element 65 contact and press the top end of the workpiece 80. Then the hook portion 535 is released from the clasping hole 517, thereby the testing device 40 moves towards the workpiece 80 until the testing probe 43 resists the calibrating element 65. At this time, the reading of the testing device 41 is reset to zero. The hook portion 535 is rotated again to clasp the clasping hole 517 to lift up the testing probe 43, the calibrating element 65 moves to the original position under the elastic force of the spring 67. Then the hook portion 535 is released from the clasping hole 517 again to release the pressing plate 51 to make the testing probe 43 move to the workpiece 80 until the bottom end portion 433 is inserted in the screw drive 81 completely, recording the reading of the testing member 411 as H1. As such, the depth of the screw drive 81 (recorded as H) can be calculated by the formula "H=H1−H2". If another workpiece needs to be tested, repeat the operations as described above.

Compared to the conventional method for testing the depth of screw drives, the test result by using the exemplary depth testing device 100 is more precise. Further, the depth testing device 100 can be widely used to test different size slotted screws. Additionally, by using the depth testing device 100, the slotted screws no longer need to be cut for testing, thus cost is reduced.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A depth testing device for testing depth of a screw drive, the drive being defined in the top end of the screw, the drive having a depth recorded as H, the depth testing device comprising:
   a supporting assembly for supporting the screw;
   a calibrating assembly comprising a calibrating element, the calibrating element contacting and pressing on the top end of the screw and, the calibrating element having a thickness recording as H2; and a testing assembly comprising a testing device and a testing probe, the testing device comprising a testing member and a testing pole stretching in or out of the testing member, one end of the testing probe being received in the testing pole, the testing assembly moving towards the calibrating element until the other end of the testing probe resisting the calibrating element, the reading of the testing member being reset to zero, then the calibrating element being removed to separate from the screw, the testing device continuing to move towards the screw until the other end of the testing probe inserting into the drive of the screw completely, recording the reading of the testing member as H1, the depth of the drive of the screw being calculated by the formula "H=H1−H2".

2. The depth testing device as claimed in claim 1, wherein the depth testing device further comprises a base, the base defines two guiding blocks thereon which face to each other and are in parallel, the end of each guiding block far from the base protrudes a resisting block towards the other guiding block, the guiding blocks, the resisting blocks, and the base cooperate to form a guiding drive, the supporting assembly is slidably mounted in the guiding drive.

3. The depth testing device as claimed in claim 2, wherein the supporting assembly comprises a sliding element, a mounting element, and two supporting elements, the sliding element is slidably mounted in the guiding drive, the mounting element is assembled on the sliding element, the mounting element defines a first mounting space in the top of the mounting element, each supporting element comprises a main body and a supporting block fastened on the main body, the main bodies are received in the first mounting space, the supporting blocks are located on the mounting element, each supporting block defines a plurality of recesses in the side towards the other supporting block, the recesses of the supporting blocks cooperate to form a plurality of supporting drives for catching and fastening the screw to be tested.

4. The depth testing device as claimed in claim 3, wherein the supporting assembly further comprises an adjusting module, the adjusting module comprises an adjusting rod, a hand shank, and a locking member, the adjusting rod defines screw threads, the mounting element defines a second mounting space in the bottom of the mounting element communicating the first mounting space, each main body defines a mounting hole radially corresponding to the second mounting space, the adjusting rod is received in the second mounting space, the two main bodies are mounted to the two ends of the adjusting rod by the mounting holes, thereby the main bodies of the two supporting elements are mounted to the first mounting space, the hand shank is mounted to one of the free end of the adjusting rod and fixed to the adjusting rod by the locking member, when the hand shank is rotated, the two supporting elements remove towards each other or away from each other, thereby adjusting or changing the widths of the supporting drives.

5. The depth testing device as claimed in claim 3, wherein each main body of the supporting element defines two first assembling holes axially, each supporting block defines two second assembling holes corresponding to the first assembling holes, each supporting block is fastened to a main body by two connecting members respectively passing through each of the first assembling holes and a corresponding second assembling hole.

6. The depth testing device as claimed in claim 2, wherein the depth testing device further comprises a holding assembly for holding the testing assembly, the holding assembly comprises a holding column, the base defines a guiding hole therein, the holding column is interference fit in the guiding hole, thereby fixing the holding column to the base.

7. The depth testing device as claimed in claim 6, wherein the holding assembly further comprises a holding bracket, the holding bracket comprises a first holding portion, the first holding portion defines a first holding hole in one end of the first holding portion, the holding column is interference fit in the first holding hole, thereby fixing the holding bracket to the holding column.

8. The depth testing device as claimed in claim 7, wherein the first holding portion defines a second holding hole and a second locking hole communicating with the second holding hole in the other end of the first holding portion, the testing assembly further comprises a protecting ring, the protecting ring defines a catching groove in the peripheral wall of the protecting ring axially, the testing device comprises a first fastening ring, the first fastening ring is connected to the testing member and located around the testing pole, the first fastening ring of the testing device is received in the protecting ring, the protecting ring is received in the second holding hole, a first locking element is provided to pass through the second locking hole and be caught in the catching groove, thereby fastening the testing device to the holding assembly.

9. The depth testing device as claimed in claim 7, wherein the holding bracket further comprises a second holding portion perpendicular to the first holding portion, the second holding portion defines two catching arms protruded from the second holding portion's free end, the two catching arms face each other, and each of which defines a catching hole therein, the depth testing device further comprises a catching assembly, the catching assembly comprises a pressing plate, the bottom surface of the pressing plate is defined a mounting portion having a mounting hole, the mounting portion is located between the catching arms, allowing the mounting hole to align with the catching holes, and a mounting post is provided to pass through the catching holes and the mounting hole, thereby fastening the pressing plate to the holding assembly.

10. The depth testing device as claimed in claim 9, wherein the pressing plate defines a holding notch at one end of the pressing plate, the testing device further comprises a second fastening ring and a stretching pole connected to the testing pole, the second fastening ring is located on the top end of the testing member and around the stretching pole, the stretching pole stretching in or out of the second fastening ring, the peripheral wall of the stretching pole is caught by the holding notch to allow the testing device to be caught by the pressing plate.

11. The depth testing device as claimed in claim 10, wherein the pressing plate defines a clasping hole in the other end of the pressing plate, the first holding portion further defines a holding groove and a first locking hole communicated the holding groove in the end of the first holding portion having the first holding hole, the catching assembly further comprises a hook, one end of the hook defines a matching hole and is mounted in the holding groove, allowing the matching hole to align with the first locking hole, a second locking element is provided to pass through the locking hole and the matching hole, thereby mounting the hook to the holding bracket, the other end of the hook defines a hook portion, the hook portion clasps the clasping hole, thereby fixing the pressing plate.

12. The depth testing device as claimed in claim 1, wherein the calibrating assembly further comprises a fastening element, a pulling rod, a spring, a blade defining a central hole therein, and a third locking element, the fastening element is defined a first fixing hole, and is mounted on the supporting assembly, the pulling rod defines a blind hole in the end away from the fastening element, the calibrating element defines a second fixing hole in one side to allow the pulling rod passing through and further matching in the first fixing hole to make the calibrating element rotate around the pulling rod, the spring is located around the free end of the pulling rod, the blade contacts and presses on the spring, the third locking element passes through the blade to match in the blind hole, thereby producing an elastic force to drive the calibrating element rotating around the pulling rod.

13. The depth testing device as claimed in claim 6, wherein the depth testing device further comprises a limiting assembly, the limiting assembly comprises a limiting screw and a nut, the holding column defines a limiting hole to allow the limiting screw passing through, and the nut is located around the free end of the limiting screw and fastens the limiting screw to the holding column, the free end of the limiting screw resists the supporting assembly, thereby limiting the position of the supporting assembly in the guiding drive.

14. A depth testing device for testing depth of a workpiece's drive, the drive being defined in the top end of the workpiece, the drive having a depth recorded as H, the depth testing device comprising:

a supporting assembly for supporting the workpiece;

a calibrating assembly comprising a calibrating element, the calibrating element contacting and pressing on the top end of the screw and, the calibrating element having a thickness recording as H2; and a testing assembly comprising a testing device and a testing probe, the testing device comprising a testing member and a testing pole stretching in or out of the testing member, the testing probe comprising a top portion and a bottom end portion, the top portion of the testing probe being received in the testing pole, the testing assembly moving towards the calibrating element until the bottom end portion of the testing probe resisting the calibrating element, the reading of the testing member being reset to zero, then the calibrating element being removed to separate from the screw, the testing device continuing to move towards the screw until the bottom end portion of the testing probe inserting into the drive of the workpiece completely, recording the reading of the testing member as H1, the depth of the drive of the workpiece being calculated by the formula "H=H1−H2".

* * * * *